US012257935B2

(12) United States Patent
Sokhi et al.

(10) Patent No.: US 12,257,935 B2
(45) Date of Patent: Mar. 25, 2025

(54) CAR SEAT ADJUSTABLE HEADREST MECHANISM

(71) Applicant: MONAHAN PRODUCTS, LLC, Rockland, MA (US)

(72) Inventors: Manpreet Singh Sokhi, Attleboro, MA (US); Robert Scott Anderson, Narvon, PA (US); Stephen Alan Kender, Hingham, MA (US)

(73) Assignee: MONAHAN PRODUCTS, LLC, Rockland, MA (US)

( * ) Notice: Subject to any disclaimer, the term of this patent is extended or adjusted under 35 U.S.C. 154(b) by 148 days.

(21) Appl. No.: 18/057,429

(22) Filed: Nov. 21, 2022

(65) Prior Publication Data

US 2024/0166109 A1 May 23, 2024

(51) Int. Cl.
*B60N 2/28* (2006.01)
*B60N 2/812* (2018.01)

(52) U.S. Cl.
CPC ............ *B60N 2/2851* (2013.01); *B60N 2/812* (2018.02)

(58) Field of Classification Search
CPC .................................................. B60N 2/2851
See application file for complete search history.

(56) References Cited

U.S. PATENT DOCUMENTS

| | | |
|---|---|---|
| 6,045,184 A | 4/2000 | Nakagawa |
| 6,135,553 A | 10/2000 | Lovie et al. |
| 6,378,950 B1 | 4/2002 | Takamizu et al. |
| 6,464,294 B1 | 10/2002 | Kain |
| 6,857,700 B2 | 2/2005 | Eastman et al. |
| 7,021,710 B2 | 4/2006 | Kain et al. |
| 7,066,536 B2 | 6/2006 | Williams et al. |
| 7,232,185 B2 | 6/2007 | Hartenstine et al. |
| 7,246,852 B2 | 7/2007 | Balensiefer |
| 7,306,284 B2 | 12/2007 | Horton et al. |
| 7,370,912 B2 | 5/2008 | Williams et al. |
| 7,862,117 B2 | 1/2011 | Hutchinson et al. |
| 8,087,725 B2 | 1/2012 | Hutchinson et al. |
| 8,764,108 B2 | 7/2014 | Gaudreau, Jr. |
| 9,022,471 B2 | 5/2015 | Gaudreau, Jr. |

(Continued)

FOREIGN PATENT DOCUMENTS

| | | | | |
|---|---|---|---|---|
| CN | 202098305 U | * | 1/2012 | ........... B60N 2/2851 |
| CN | 105711450 A | | 6/2016 | |

(Continued)

OTHER PUBLICATIONS

International Search Report and Written Opinion from corresponding International Application No. PCT/US2023/034152 dated Jan. 29, 2024.

*Primary Examiner* — Timothy J Brindley
(74) *Attorney, Agent, or Firm* — Lando & Anastasi, LLP

(57) ABSTRACT

According to at least one aspect of the present disclosure a car seat having an adjustable headrest is disclosed. The car seat comprises a shell; an adjustment portion coupled to the shell, the adjustment portion having a plurality of grooves; a headrest portion slidably coupled to the adjustment portion; at least one prong coupled to the headrest portion, the at least one prong configured to fit within a groove of the plurality of grooves; a handle; and a fixing member coupled to the handle, the fixing member being configured to retain the at least one prong in a fixed state.

17 Claims, 11 Drawing Sheets

(56) References Cited

U.S. PATENT DOCUMENTS

| | | | |
|---|---|---|---|
| 9,114,739 B2 * | 8/2015 | Conway | B60N 2/2863 |
| 9,211,817 B2 | 12/2015 | Leese | |
| 2016/0362025 A1 * | 12/2016 | Heisey | B60N 2/265 |
| 2023/0242015 A1 * | 8/2023 | Walsh | B60N 2/2887 |
| | | | 24/591.1 |
| 2023/0365033 A1 * | 11/2023 | Vibhuti | B60N 2/2851 |

FOREIGN PATENT DOCUMENTS

| | | | | |
|---|---|---|---|---|
| CN | 108528292 A | | 9/2018 | |
| CN | 111923792 A | * | 11/2020 | B60N 2/2821 |
| CN | 112406646 A | * | 2/2021 | |
| CN | 115583182 A | * | 1/2023 | |
| CN | 116353442 A | * | 6/2023 | |
| CN | 116533844 A | * | 8/2023 | |
| CN | 117022071 A | * | 11/2023 | B60N 2/28 |
| DE | 102014100380 A1 | | 7/2014 | |
| DE | 202015107068 U1 | | 1/2016 | |
| DE | 202022100380 U1 | * | 4/2022 | |
| EP | 0302607 A2 | | 2/1989 | |
| EP | 0751033 A2 | | 1/1997 | |
| EP | 3708421 A1 | * | 9/2020 | B60N 2/26 |
| NL | 1036865 C2 | | 10/2010 | |

* cited by examiner

CAR SEAT ADJUSTABLE HEADREST MECHANISM

BACKGROUND

At least one example in accordance with the present disclosure relates generally to headrests for infant car seats. Infant car seats typically secure an infant safely in place in an automobile. Some infant car seats are designed to attach to a car seat base, the car seat base being directly affixed to part of the car.

SUMMARY

According to at least one aspect of the present disclosure a car seat having an adjustable headrest is disclosed. The car seat comprises a shell; an adjustment portion coupled to the shell, the adjustment portion having a plurality of grooves; a headrest portion slidably coupled to the adjustment portion; at least one prong coupled to the headrest portion, the at least one prong configured to fit within a groove of the plurality of grooves; a handle; and a fixing member coupled to the handle, the fixing member being configured to retain the at least one prong in a fixed state.

In some examples, the at least one prong has a head portion configured to fit within the groove of the plurality of grooves. In various examples, the at least one prong is configured to bias the head portion into the groove of the plurality of grooves. In many examples, the fixing member has an angled surface configured to slidably mate with a complimentary angled surface of the at least one prong, such that retaining the at least one prong in a fixed state includes the fixing member fitting over at least the head portion of the at least one prong. In various examples, the handle is configured to slidably operate the fixing member relative to the at least one prong such that the at least one prong is in an open state. In many examples, the adjustment portion includes a grooved member, the plurality of grooves being part of the grooved member.

In some examples, the grooved member includes a first half having a first plurality of grooves, and a second half opposite the first half, the second half having a second plurality of grooves. In many examples, the grooved member includes a first end, a middle section, and a second end, the plurality of grooves being on the middle section. In some examples, the car seat further comprises a crossbar; at least one crossbar insert having a first end and a second end; and a lodgment coupled to the headrest portion and configured to hold the crossbar; and at least one crossbar travel coupled to the adjustment portion. In various examples, the at least one crossbar travel is configured to slidably hold the first end of the at least one crossbar insert, and the crossbar is configured to receive the second end of the at least one crossbar insert.

At least on aspect of the present disclosure is related to a system for adjusting the headrest of a car seat. The system comprises a shell; a grooved member having a plurality of grooves, the grooved member being coupled to the shell; a headrest portion having at least one prong, the headrest portion being slidably coupled to the grooved member, and the at least one prong being configured to fit within a groove of the plurality of grooves of the grooved member; and a fixing member slidably coupled to the grooved member.

In many examples, the fixing member is configured to operate in a fixed state, the fixed state corresponding to the fixing member being placed to prevent the at least one prong from leaving a groove of the plurality of grooves. In various examples, the fixing member surrounds the at least one prong on at least two sides in the fixed state. In some examples, the fixing member is configured to operate in an open state, the open state corresponding to the fixing member being placed to not prevent the at least one prong from leaving the groove of the plurality of grooves. In many examples, the at least one prong includes a head at an end of the at least one prong, the head configured to fit at least partially within the groove of the plurality of grooves. In various examples, the at least one prong is configured to bias the head into the groove of the plurality of grooves.

In some examples, the system further comprises a handle, the handle being coupled to the fixing member and being configured to operate the fixing member between the fixed state and the open state. In various examples, operating the fixing member between the fixed state and the open state includes sliding the fixing member upward into a position where it does not obstruct the at least one prong to put the fixing member in the open state and sliding the fixing member downward into a position where it does obstruct the at least one prong to put the fixing member in the fixed state. In many examples, the grooved member has a first end, a second end, and a middle section, the middle section including the plurality of grooves. In various examples, the first end and the second end are configured to prevent the at least one prong from leaving the middle section. In many examples, the system further comprises at least one crossbar travel; a crossbar configured to slidably move with respect to the at least one crossbar travel; and a lodgment coupled to the headrest portion and configured to hold the crossbar.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Car seats are special seats designed to secure infants when the infants are transported via car, pram, stroller, or in another manner. There is a need for adjustable headrest components in car seats to accommodate infants of various sizes and shapes, and to ensure that the infant is properly protected in the event of a crash (for example, protected from whiplash or other injury).

Figure 1A:
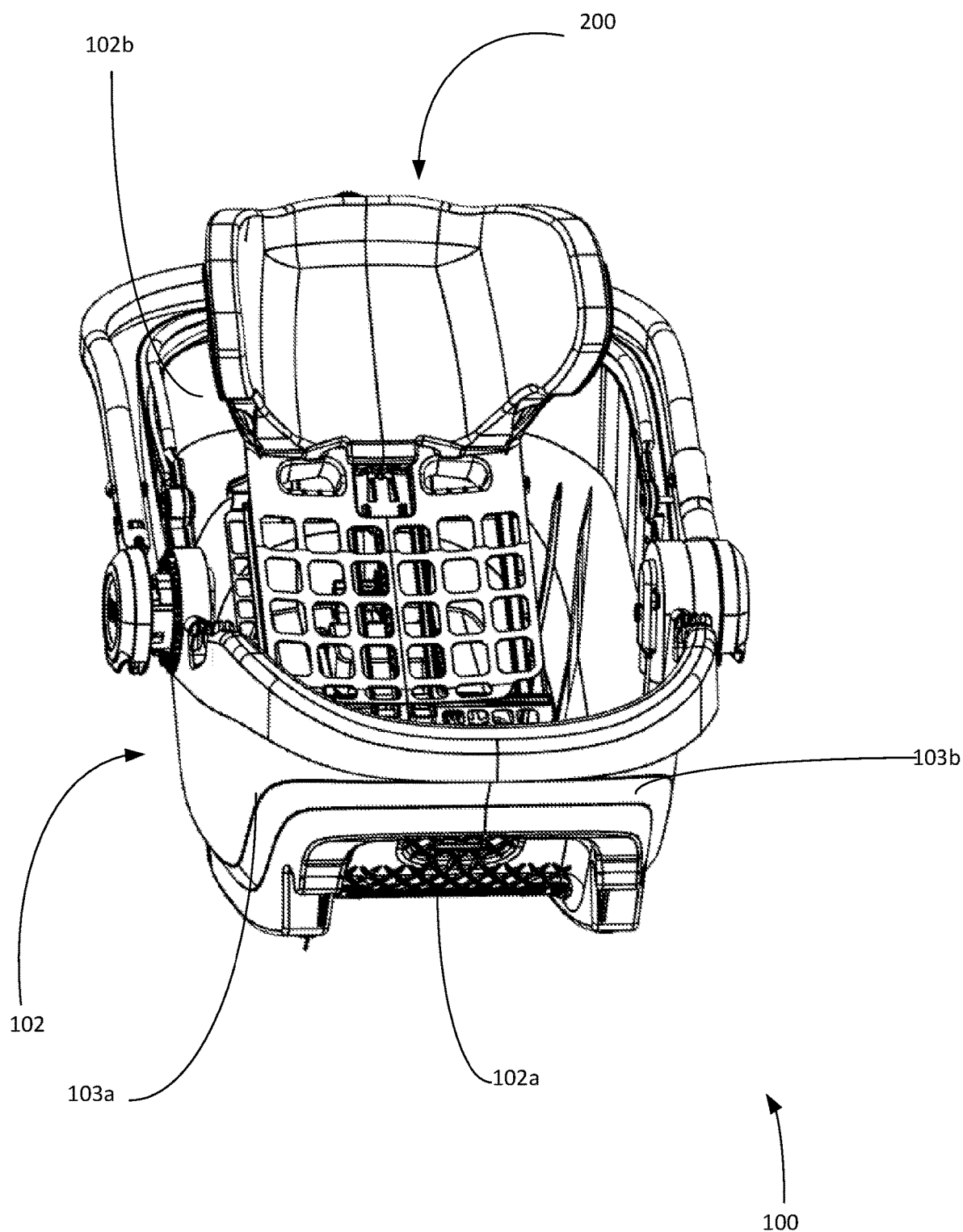
FIG. 1A illustrates a schematic diagram of a car seat according to an example.

Turning to the figures, FIG. 1A illustrates a schematic diagram of a car seat 100 according to an example. Car seat 100 includes a shell 102 and an adjustable headrest 200. Shell 102 includes a first half 103a and a second half 103b. Shell 102 also includes an underside 102a and a back 102b. The adjustable headrest 200 is coupled to the shell 102, and will be discussed in greater detail with respect to FIGS. 2A-5C.

Figure 1B:
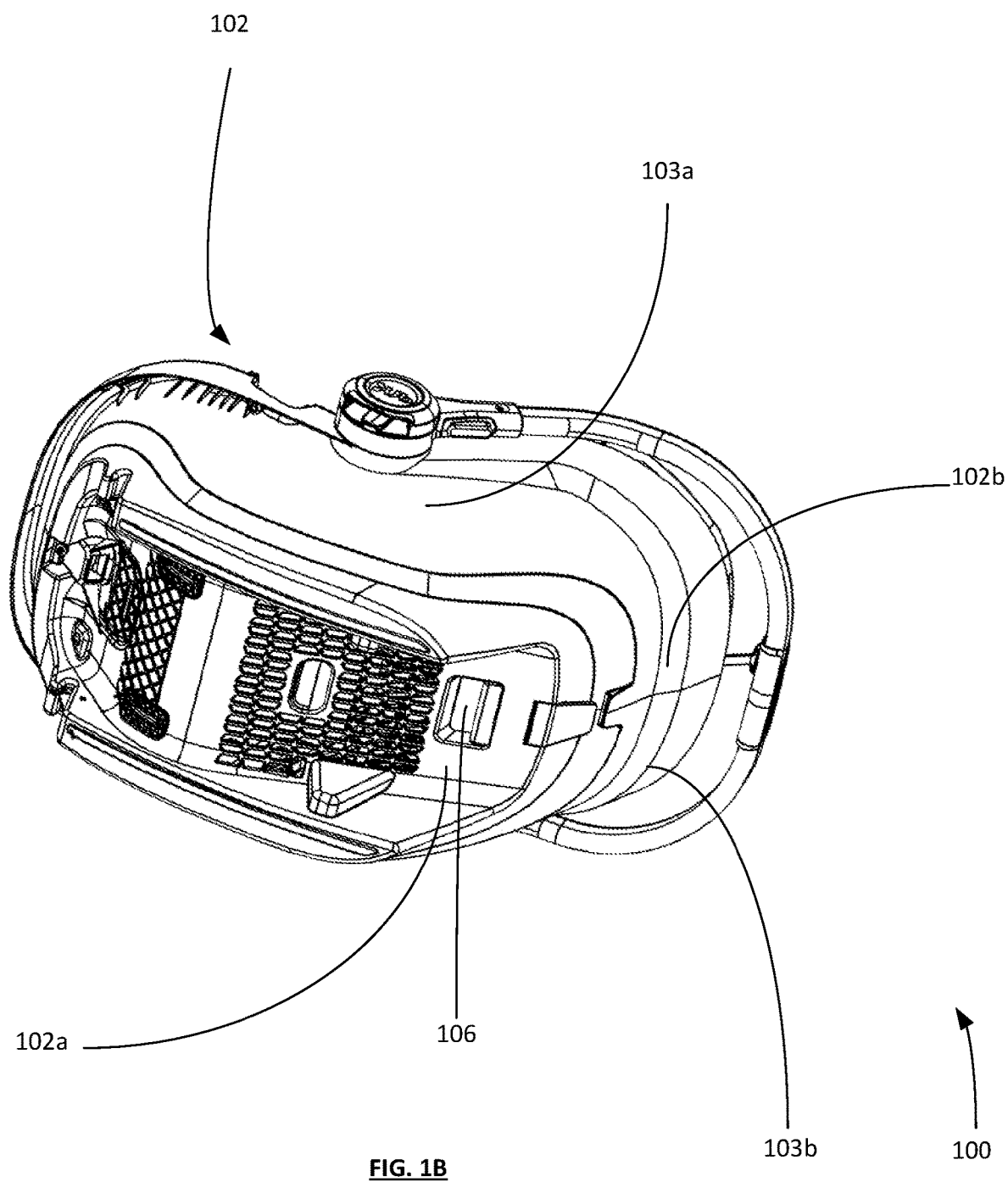
FIG. 1B illustrates a schematic diagram of a car seat according to an example.

FIG. 1B illustrates the schematic diagram of FIG. 1A of car seat 100 from a low angle.

Figure 2A:
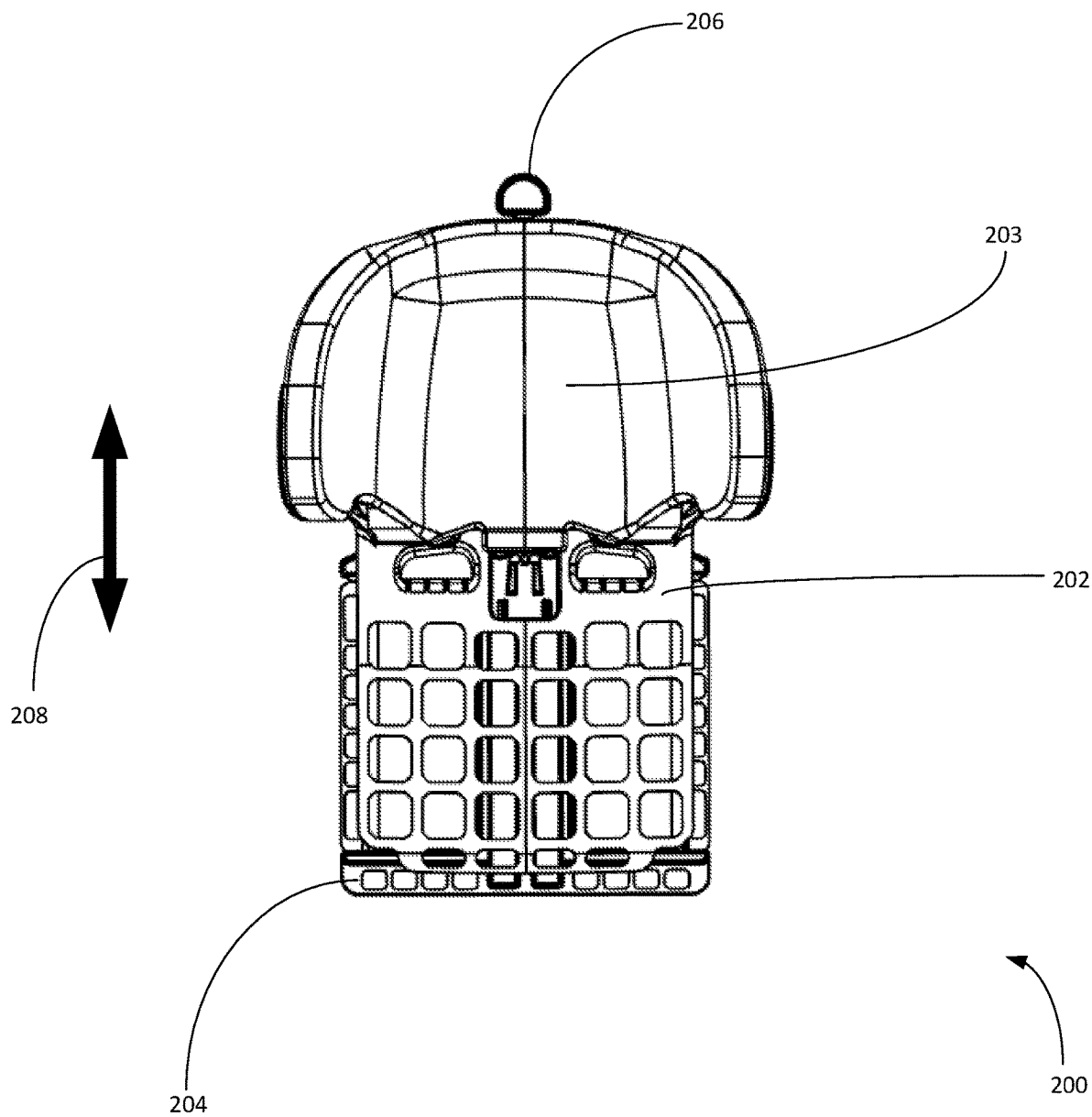
FIG. 2A illustrates a schematic diagram of an adjustable headrest from a front view.

FIG. 2A illustrates the adjustable headrest 200 from a front angle according to an example. The adjustable headrest 200 includes a headrest portion 202, a padding 203, an adjustment portion 204, and a handle 206. Headrest portion 202 is coupled to shell 102. Adjustment portion 204 is slidably coupled to headrest portion 202. Headrest portion 204 may, for example, slide up and down with respect to adjustment portion 202, as shown by arrow 208. Padding 203 is coupled to headrest portion 202 and moves with headrest portion 202. Padding 203 may, for example, provide padding to comfortably and safely retain an infant's head. Handle 206 is coupled to a fixing member (not shown) and operates the fixing member by sliding it up and down, for example, in the directions shown by arrow 208. Details of headrest portion 202, adjustment portion 204, and handle 206 will be discussed in greater detail with respect to other figures, herein.

Figure 2B:
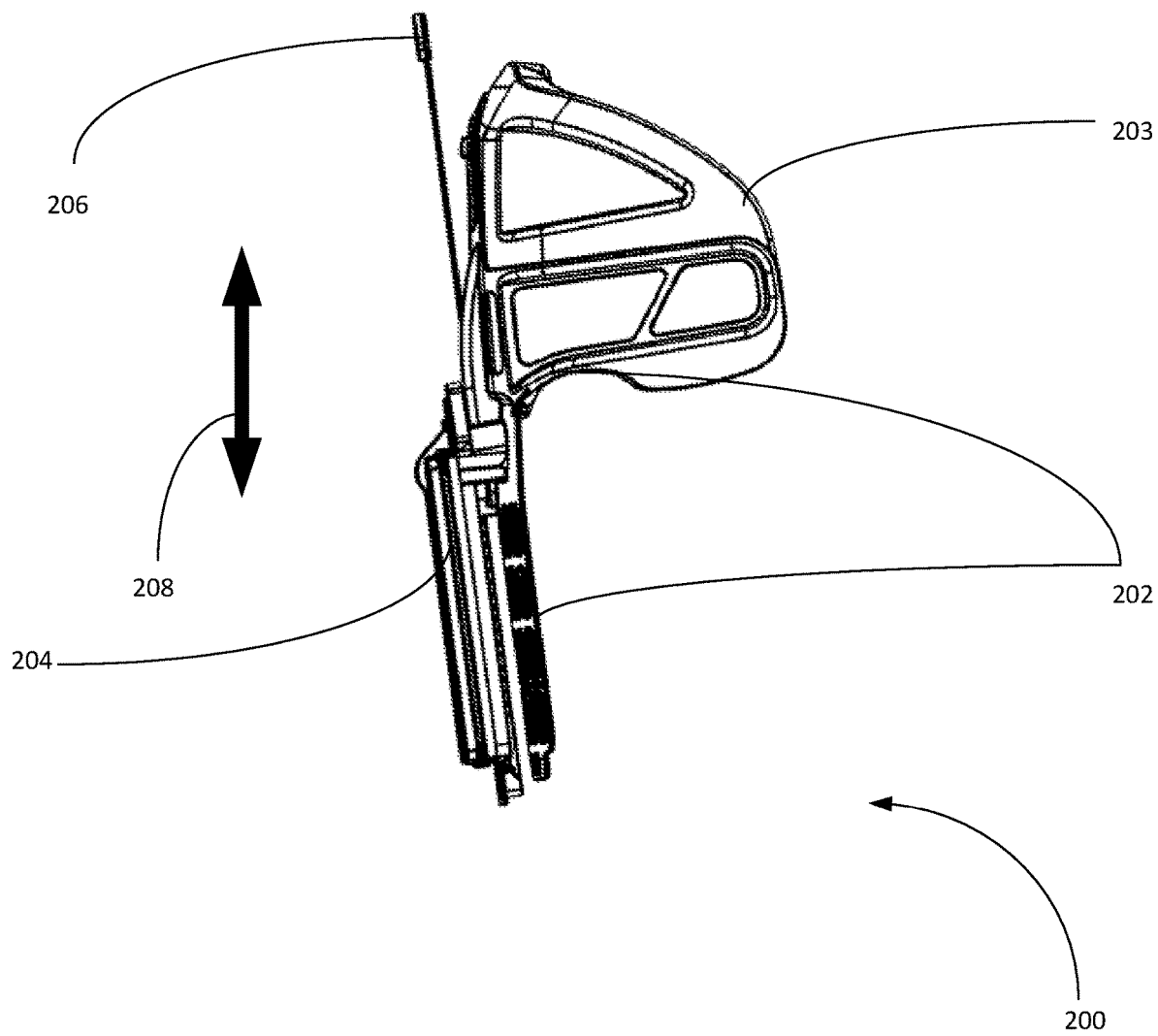
FIG. 2B illustrates a schematic diagram of an adjustable headrest from a side view.

FIG. 2B illustrates adjustable headrest 200 from a side view.

Figure 2C:
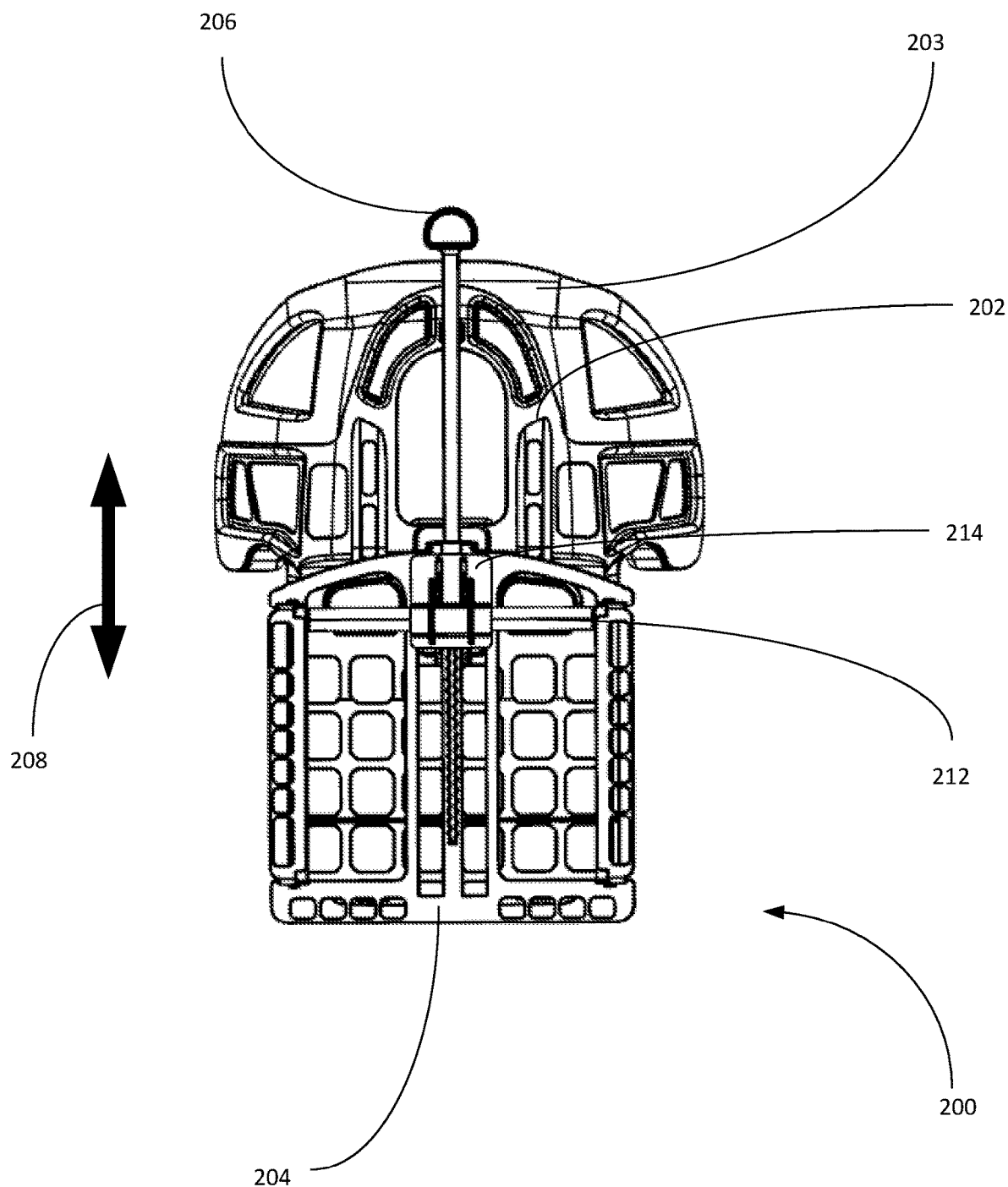
FIG. 2C illustrates a schematic diagram of an adjustable headrest from a back view.

FIG. 2C illustrates adjustable headrest 200 from a reverse view. A crossbar 212 is slidably coupled to the adjustment portion 204, such that it can slide up and down, for example in the direction of arrow 208. A lodgment 214 is coupled to headrest portion 202, for example by screws or bolts, and may slide along the adjustment portion 204, for example in the direction of arrow 208. The lodgment 214 and crossbar 212 may be coupled together such that they move in unison with each other and/or headrest portion 202.

In some examples, the headrest portion 202 and a harness, for example a harness used to hold an infant in the baby seat, move together in unison. That is, a highest position of the headrest portion 202 corresponds to the highest position of the harness, and a lowest position of the headrest portion 202 corresponds to the lowest position of the harness. In some examples, the crossbar 212 may be more than just a structural element. In some examples, the crossbar 212 may serve as routing for the harness, and may be used to guide or hold the harness in various positions.

Figure 3A:
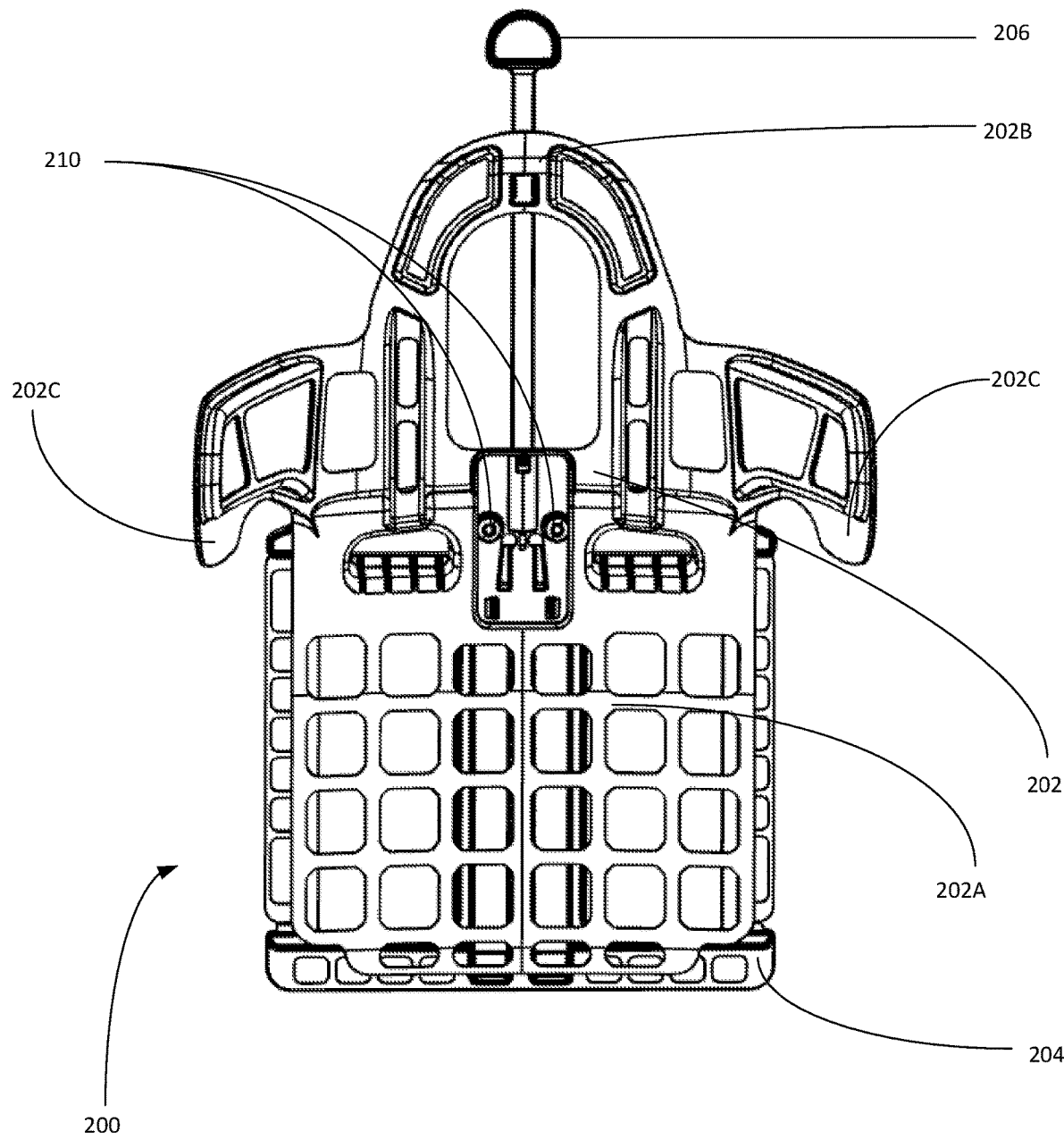
FIG. 3A illustrates a schematic diagram of an adjustable headrest from a front view.
Figure 3B:
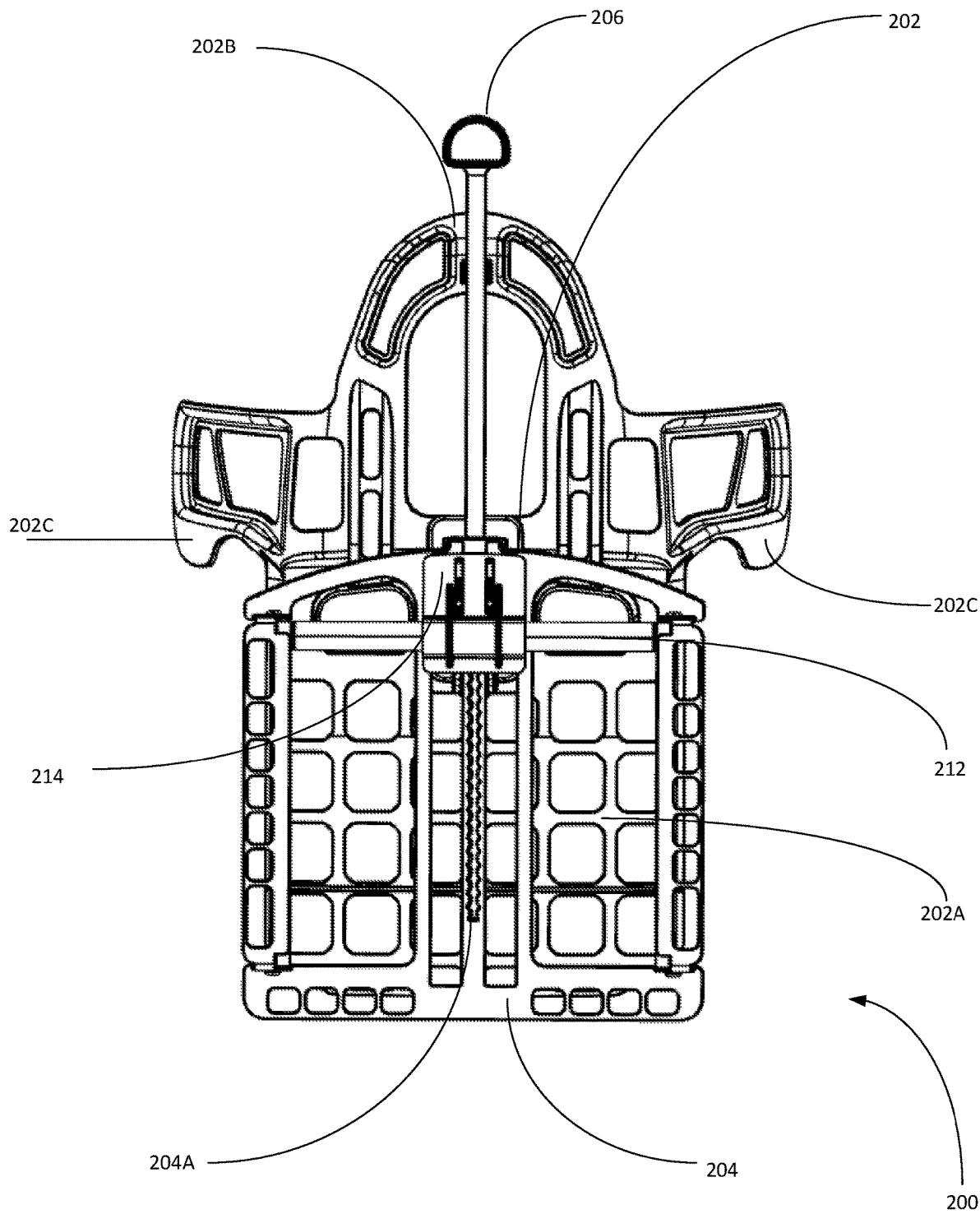
FIG. 3B illustrates a schematic diagram of an adjustable headrest from a back view.

FIGS. 3A and 3B illustrates the adjustable headrest 200 without the padding 203.

FIG. 3A illustrates the adjustable headrest 200 from a front view. Headrest portion 202 may include a lower, planar section 202a with various square-shaped holes through it, as well as an upper section 202c configured to receive the padding 203. Headrest portion 202 may also include two wings 202c on either side of the upper section 202b which may be configured to receive the padding 203 and which may extend outward and forward (that is, toward the viewer) from the plane of the planar section 202a. In this way, the upper section 202c and wings 202c may form a generally semicircular structure that may retain an infant's head. Two screws 210 are shown which may couple the lodgment 214 (not shown) to the headrest portion 202. It will be appreciated that the screws may be replaced with any sort of bolt, nail, coupler, nut, pin, snaps, other fastening features, and so forth. For clarity, such coupling devices shall be referred to as "screws" herein.

FIG. 3B illustrates the adjustable headrest 200 from a rear view. Adjustment portion 204 includes a grooved member 204a. Grooved member 204a includes a plurality of grooves. The grooves may be located on a first side of the grooved member 204a and/or a second side opposite the first side. In some examples, the grooves may be located on the "right" and "left" sides of the grooved member 204a with respect to the perspective of FIG. 3B. Grooved member 204a may be considered as having three sections, including a first end, a middle section, and a second end. The plurality of grooves may be located on only the middle section, such that the first and second ends lack any grooves. The grooved member 204a will be discussed in greater detail with respect to FIGS. 4 through 5B.

Figure 4:
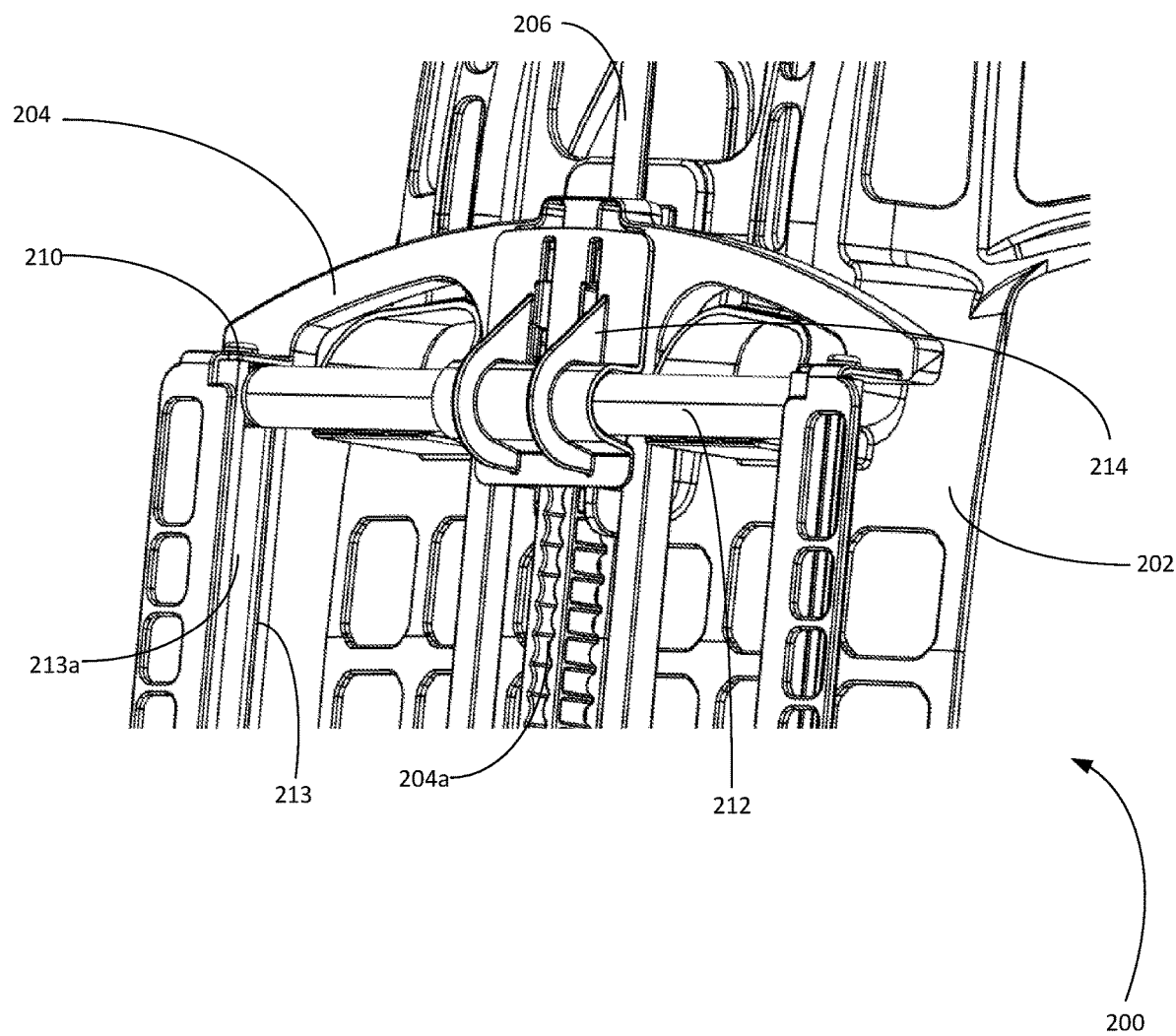
FIG. 4 illustrates a schematic diagram of a close up view of various parts of the adjustable headrest.

FIG. 4 illustrates a close-up side view of various parts of adjustable headrest 200 according to an example. Crossbar 212 is connected at a first end to crossbar travel 213 via a crossbar insert (not shown). Crossbar 212 is connected to a second crossbar travel located opposite the crossbar travel 213 via a crossbar insert (not shown). Crossbar travel 213 is coupled to adjustment portion 204 via screws 210.

As can be seen in FIG. 4, each groove of the grooved member 204a is semicircular. It will be appreciated that any shape capable of receiving another shape, for example any concave shape, may be used for the grooves. Each groove may be separated from each other groove by a small ridge or flat portion.

Crossbar travel 213 may have a channel 213a within it that receives crossbar inserts. The crossbar inserts may slide up and down channel 213a. As a result, crossbar 212 may move up and down with respect to channel 213a of crossbar travel 213.

Figure 5A:
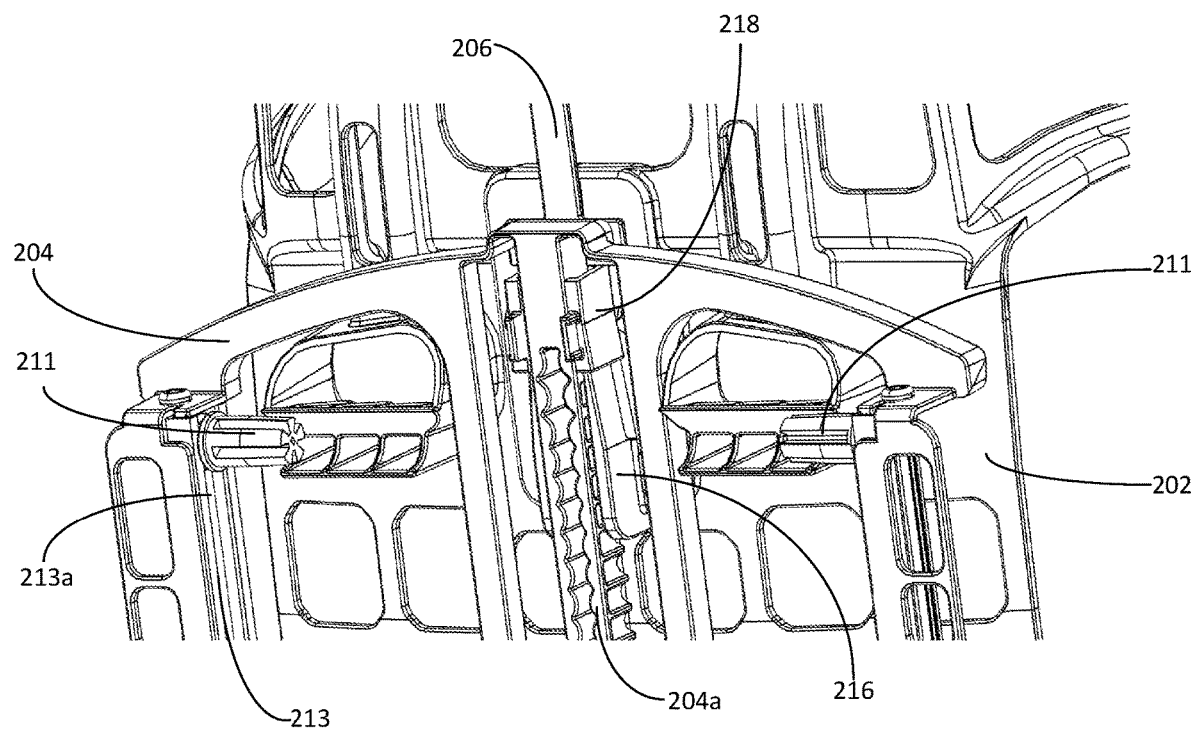
FIG. 5A illustrates a schematic diagram of the sliding mechanism of the adjustable headrest according to a first view.
Figure 5B:
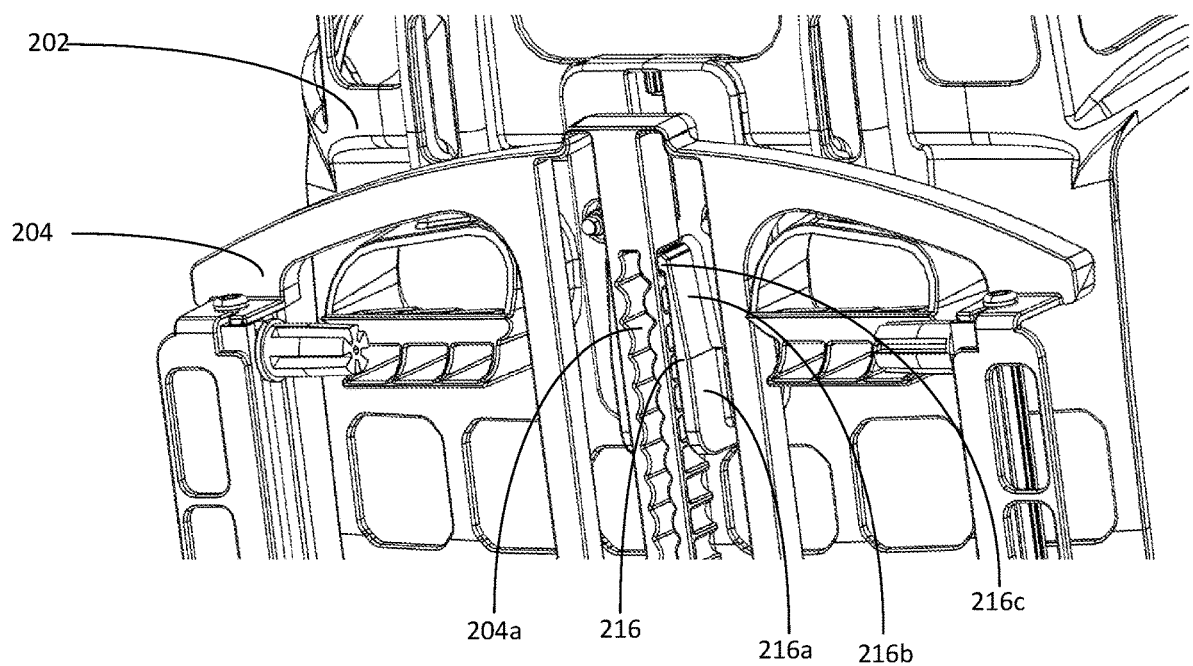
FIG. 5B illustrates a schematic diagram of the sliding mechanism of the adjustable headrest according to a second view.
Figure 5C:
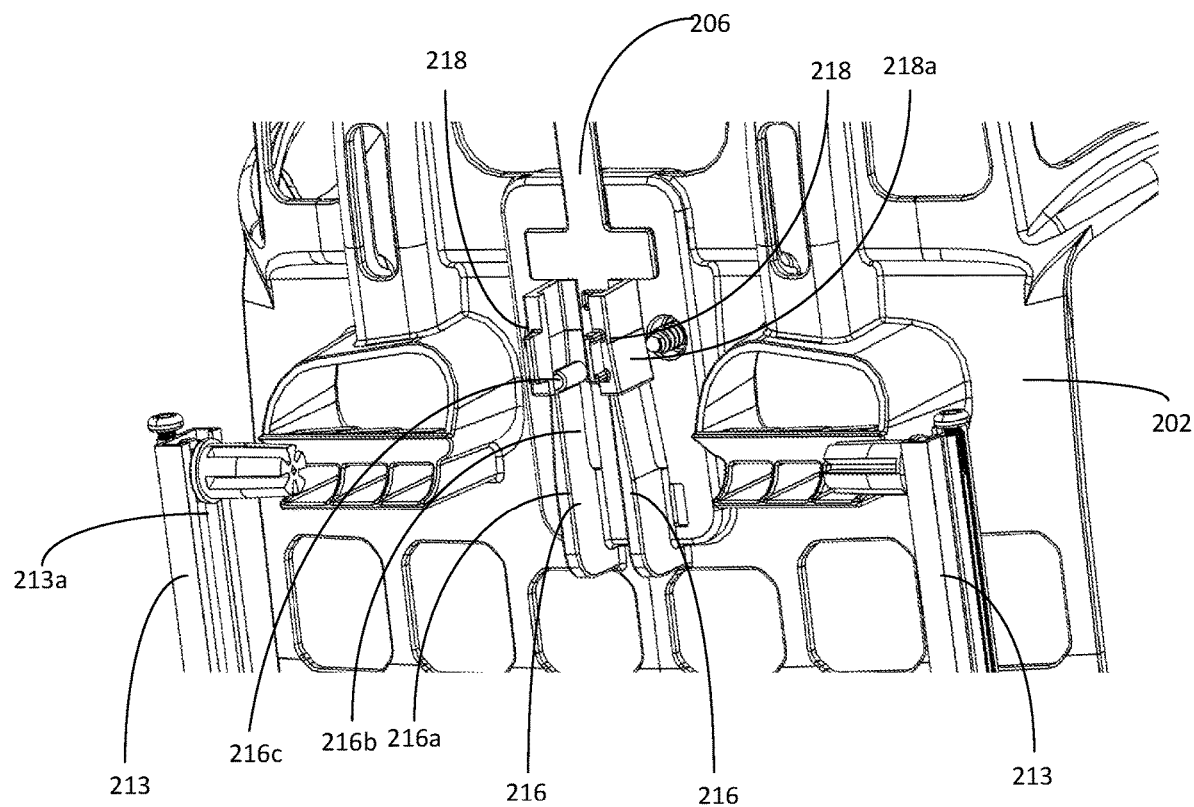
FIG. 5C illustrates a schematic diagram of the sliding mechanism of the adjustable headrest according to a third view.

FIGS. 5A-5C illustrates views of the mechanism that controls the sliding of the headrest portion 202 with respect to the adjustment portion 204.

FIG. 5A illustrates the sliding mechanism according to a first view. The crossbar inserts 211 may be coupled within channel 213a of crossbar travel 213 and may be configured to be receive an end of crossbar 212. A prong 216 is coupled to headrest portion 202. A second prong 216 may also be coupled to headrest portion 202. Second prong 216 may be coupled opposite first prong 216, such that both prongs 216 bias respective heads 216c inward into grooves on either side of the grooved member 204a. Second prong 216 may be coupled to headrest portion 202 at a position on an opposite side of the grooved member 204a from the first prong 216. A fixing member 218 is coupled to handle 206. The relationship of prong 216, fixing member 218, and grooved member 204A will be discussed in greater detail with respect to FIGS. 5B and 5C below.

FIG. 5B illustrates the sliding mechanism according to a second view. The fixing member 218 and handle 206 are omitted. Prong 216 is shown with its head 216c nested within a groove of grooved member 204a.

Prong 216 protrudes from headrest portion 202 in the direction of adjustment portion 204. Prong 216 has a parallel segment 216a that is parallel to grooved member 204a. Prong 216 has a beveled segment 216b that has a side which is angled inward, toward grooved member 204a. Beveled segment 216b is connected at one end to parallel segment 216a and at the opposite end to head 216c. Head 216c is a rounded shape that nests within the groove of grooved segment 204a.

When fixing member 218 is not present, a user may move headrest portion 202 up or down. To move headrest portion 202 in this manner, the user may apply force sufficient to overcome the biasing force of prong 216 that keeps head 216c nested within the grooves of grooved member 204a. In some examples, beveled segment 216b provides sufficient flexibility, due to its beveled side, for head 216c to move outward when a user applies sufficient force. In some examples, the rounded shape of head 216c and/or of the grooves allows head 216c to slide away from the grooves when force is applied. Head 216c can thus be positioned within any groove of the plurality of grooves of grooved member 204a. Grooved member 204a may not have grooves on its first or second end, as described above, but may only have grooves on its middle section. Limiting placement of the grooves to the middle section may define the limits of where headrest portion 202 can remain. That is, a first groove may correspond to a highest position of headrest portion 202 and a last groove may correspond to a lowest position of headrest portion 202, with the remaining grooves being between the first and last grooves.

In some embodiments, the first end and/or second end of grooved member 204a may be configured such that prong 216 and/or head 216c cannot move beyond the first groove and/or the last groove of grooved member 216c, even if fixing member 218 is not present.

FIG. 5C illustrates the sliding mechanism according to a third view. The grooved member 204a and adjustment portion 204 are omitted. Fixing member 218 may be coupled to handle 206. When handle 206 is moved up or down, fixing member 218 may move with handle 206. Fixing member 218 may be configured to surround (or nest around) prong 216. In some examples, fixing member 218 may be configured to receive and surround head 216c. Fixing member 218 may have a complimentary beveled edge 218a that angles outward from the grooved member 204a (not shown) and that matches the incline of beveled segment 216b of prong 216. In this way, fixing member 218 may be limited in downward motion such that head 216c is always contained within fixing member 218 when fixing member 218 is not pulled upward by handle 206. That is, when fixing member 218 is resting on beveled segment 216b, head 216c is held in the fixed state by fixing member 218.

In the open state prong 216 may move freely along the grooved member 204a and/or within the middle section of the grooved member 204a. For example, in the open state, head 216c may move from groove to groove as described with respect to FIG. 5B. In the fixed state the prong 216 may not move freely along the grooved member 204a. In the fixed state, fixing member 218 may provide a barrier to the movement of head 216c, preventing head 216c from moving out of the grooves of the grooved member 204a. If handle 206 is operated to pull fixing member 218 upward, fixing member 218 no longer surrounds head 216c, and so head 216c may move out of the grooves of grooved member 204a as described above.

It will be appreciated that the bias provided by prong 216 to keep head 216c in the grooves of grooved member 204a need not necessarily be an active force applied to head 216c at all times. Instead, in some examples, prong 216 provides an equal and opposite force to the force exerted by grooved member 204a on head 216c when the user operates the headrest portion 202. That is, rather than providing an active force, prong 216 can provide a resistive force or resistance to movement.

The shell may be made from a single piece (for example, a single piece mold) or from multiple pieces joined together. The elements, devices, and parts described above may be made of any suitable material, for example plastic, metal, wood, fabric, and so forth, and/or may be made from any combination of suitable materials and/or composite materials.

Examples of the methods and systems discussed herein are not limited in application to the details of construction and the arrangement of components set forth in the following description or illustrated in the accompanying figures. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A car seat having an adjustable headrest, the car seat comprising:
   a shell;
   an adjustment portion coupled to the shell, the adjustment portion having a plurality of grooves;

a headrest portion slidably coupled to the adjustment portion;

at least one prong coupled to the headrest portion, the at least one prong configured to fit within a groove of the plurality of grooves, the at least one prong including a head portion configured to fit within the groove;

a handle; and a fixing member coupled to the handle, the fixing member being configured to retain the at least one prong in a fixed state, the fixing member having an angled surface configured to slidably mate with a complimentary angled surface of the at least one prong, such that retaining the at least one prong in a fixed state includes the fixing member fitting over at least the head portion of the at least one prong.

2. The car seat of claim 1, wherein the at least one prong is configured to bias the head portion into the groove of the plurality of grooves.

3. The car seat of claim 1, wherein the handle is configured to slidably operate the fixing member relative to the at least one prong such that the at least one prong is in an open state.

4. The car seat of claim 1, wherein the adjustment portion includes a grooved member, the plurality of grooves being part of the grooved member.

5. The car seat of claim 4, wherein the grooved member includes a first half having a first plurality of grooves, and a second half opposite the first half, the second half having a second plurality of grooves.

6. The car seat if claim 4, wherein the grooved member includes a first end, a middle section, and a second end, the plurality of grooves being on the middle section.

7. The car seat of claim 1 further comprising:
a crossbar;
at least one crossbar insert having a first end and a second end; and
a lodgment coupled to the headrest portion and configured to hold the crossbar; and
at least one crossbar travel coupled to the adjustment portion.

8. The car seat of claim 7, wherein the at least one crossbar travel is configured to slidably hold the first end of the at least one crossbar insert, and the crossbar is configured to receive the second end of the at least one crossbar insert.

9. A system for adjusting the headrest of a car seat, the system comprising:
a shell;
a grooved member having a plurality of grooves, the grooved member being coupled to the shell;

a headrest portion having at least one prong, the headrest portion being slidably coupled to the grooved member, and the at least one prong being configured to fit within a groove of the plurality of grooves of the grooved member; and a fixing member slidably coupled to the grooved member, the fixing member being configured to operate in a fixed state, the fixed state corresponding to the fixing member being placed to prevent the at least one prong from leaving a groove of the plurality of grooves, the fixing member surrounding the at least one prong on at least two sides in the fixed state.

10. The system of claim 9, wherein the fixing member is configured to operate in an open state, the open state corresponding to the fixing member being placed to not prevent the at least one prong from leaving the groove of the plurality of grooves.

11. The system of claim 10, wherein the at least one prong includes a head at an end of the at least one prong, the head configured to fit at least partially within the groove of the plurality of grooves.

12. The system of claim 10, wherein the at least one prong is configured to bias the head into the groove of the plurality of grooves.

13. The system of claim 10 further comprising a handle, the handle being coupled to the fixing member and being configured to operate the fixing member between the fixed state and the open state.

14. The system of claim 13 wherein operating the fixing member between the fixed state and the open state includes sliding the fixing member upward into a position where it does not obstruct the at least one prong to put the fixing member in the open state and sliding the fixing member downward into a position where it does obstruct the at least one prong to put the fixing member in the fixed state.

15. The system of claim 9 wherein the grooved member has a first end, a second end, and a middle section, the middle section including the plurality of grooves.

16. The system of claim 15 wherein the first end and the second end are configured to prevent the at least one prong from leaving the middle section by being ungrooved and shorter in length than the fixing member.

17. The system of claim 9 further comprising:
at least one crossbar travel;
a crossbar configured to slidably move with respect to the at least one crossbar travel; and
a lodgment coupled to the headrest portion and configured to hold the crossbar.

* * * * *